Patented Dec. 30, 1947

2,433,401

UNITED STATES PATENT OFFICE 2,433,401

SELENIUM PASTE AND METHOD OF MAKING AND APPLYING IT

Otto Saslaw, Kearny, N. J., assignor to International Telephone & Radio Manufacturing Corporation, New York, N. Y., a corporation of Delaware No Drawing. Application April 24, 1942, Serial No. 440,409

6 Claims. (Cl. 117—23)

This invention relates to selenium paste and has for its objects to provide a paste and a method of making it and applying it to a base plate to form a selenium element useful in rectifiers.

Heretofore, it has been a common practice to make selenium rectifier elements by depositing vitreous amorphous selenium powder on a hot disc or base plate and applying heat to melt the selenium and fuse it to the plate. This has been a slow operation as the melting selenium had to be well spread to make it cover the plate evenly and the surface tension of the molten selenium tended to make the operation tedious. Owing to the slowness of the coating operation the parts of the hot base plate, ordinarily of steel, which remained uncoated for a time while hot, would oxidize to some extent, which was found to be harmful to the selenium element. In accordance with my invention I provide a paste in which the vitreous selenium powder is held in suspension in a volatile medium so that the paste may easily and quickly be applied to the base plate, as by brushing or spraying. The disc may be heated to vaporize off the volatile medium, leaving the selenium on the disc in a smooth covering layer.

Vitreous amorphous selenium, which is a desirable form for coating on a base plate, has heretofore been difficult to mix into a paste as it does not readily enter into suspension. I have found, however, that by adding a small amount of red amorphous selenium powder, a relatively large amount of the desired vitreous selenium powder can be held in suspension in a suitable volatile carrier. In accordance with my invention I provide a paste composed of vitreous selenium powder mixed with some red amorphous selenium powder in a volatile carrier which may be, for example, methyl-alcohol or amyl-acetate.

The red amorphous selenium may be obtained freshly prepared for this purpose by the reduction of selenium dioxide, and when thus obtained is in a light, fluffy form of the red amorphous selenium which is satisfactory for use in this paste. The vitreous selenium used herein is the black amorphous form which may be obtained, for example, by melting a red amorphous selenium, allowing it to solidify and then grinding it to a powder. I have found that a good practice is to mix mechanically the red selenium with the volatile carrier to form a light paste. To this mixture I add the vitreous selenium powder in a rather finely ground form. Reference is made here to my copending application Serial No. 440,410, filed concurrently herewith, and now abandoned, in which there is described and claimed a paste in which the vitreous selenium is enabled to be held in suspension without the need for red selenium, by grinding the vitreous form to as fine as an 80 mesh. The paste described in the present application containing some red selenium does not require that the vitreous selenium be ground as fine as an 80 mesh. I have found that the vitreous and the red selenium may be mixed in almost any proportion to provide a workable paste. The ratio which I prefer to use, however, is approximately 15 to 20 parts by weight of the vitreous selenium to one part by weight of the red selenium. Enough of the carrier should be present for ease of manipulation of the paste and will be dependent somewhat upon the method to be used in applying it to the base plate. For example, if it is to be used in a spray, the mixture should be somewhat thinner than if applied by a brushing operation.

After the paste thus made is applied to the disc or base plate the carrier is caused to volatilize by the application of sufficient heat to produce the vaporization, which will leave an evenly distributed residue of the selenium substance on the base plate. The base plate as thus coated is then subjected to heat and pressure to induce crystal formation and present a smooth selenium surface. The amount of pressure which is permissible may vary within considerable limits, the criterion for the amount of pressure being that the resultant layer should appear smooth and should remain adhesive to the base plate. I have found that a pressure of several thousand pounds per square inch at a temperature of 120° C. is satisfactory.

The heat and pressure are preferably applied simultaneously. In applying pressure to the selenium coated plate, care should be exercised to use between the pressure plate of the press and the selenium surface a sheeting of a material which is not injurious to the selenium. Suitable materials are sheets of mica or sheets of aluminum with some amount of oxide on the aluminum. Following this heat and pressure treatment any desired further treatments may be made. For example, the temperature might be raised to around 200° C. to complete the conversion of the selenium to the crystalline form, as is well known in the art.

What I claim is:

1. A paste comprising a mixture of red amorphous selenium powder, vitreous amorphous selenium powder and a volatile liquid carrier in which the selenium powder is in suspension.

2. A paste comprising a suspension of red amorphous selenium powder, vitreous amorphous selenium powder and a volatile liquid carrier selected from the group consisting of methyl-alcohol and amyl acetate.

3. A paste comprising a suspension in a volatile liquid carrier of 15 to 20 parts by weight of vitreous amorphous selenium powder to one part by weight of red amorphous selenium powder.

4. The method of making a selenium paste which comprises mixing red amorphous selenium powder and vitreous amorphous selenium powder in a volatile liquid carrier.

5. The method of making a selenium paste which comprises mixing red amorphous selenium in a volatile liquid carrier to form a light paste and then mixing vitreous selenium powder in the paste.

6. The method of making a selenium element which comprises applying on the surface of a plate a paste of a suspension in a volatile liquid carrier of vitreous amorphous selenium powder mixed with red amorphous selenium powder, then volatilizing the carrier and then applying heat and pressure against the residue on the plate.

OTTO SASLAW.

REFERENCES CITED

The following references are of record in the file of this patent:

UNITED STATES PATENTS

| Number | Name | Date |
|---|---|---|
| 2,066,611 | Christy | Jan. 5, 1937 |
| 1,655,269 | Howe | Jan. 3, 1928 |

OTHER REFERENCES

Abstract of Article by S. Miyamoto, Chem. Abstracts, 1935, vol. 29, page 7751.

Certificate of Correction

Patent No. 2,433,401.

December 30, 1947.

OTTO SASLAW

It is hereby certified that the name of the assignee in the above numbered patent was erroneously described and specified as "International Telephone & Radio Manufacturing Corporation" whereas said name should have been described and specified as *Federal Telephone and Radio Corporation*; as shown by the record of assignments in this Office; and that the said Letters Patent should be read with this correction therein that the same may conform to the record of the case in the Patent Office.

Signed and sealed this 23rd day of March, A. D. 1948.

[SEAL]

THOMAS F. MURPHY,
*Assistant Commissioner of Patents.*